(12) United States Patent
Malkes et al.

(10) Patent No.: US 10,636,298 B2
(45) Date of Patent: Apr. 28, 2020

(54) ADAPTIVE TRAFFIC CONTROL USING OBJECT TRACKING AND IDENTITY DETAILS

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/032,886

(22) Filed: Jul. 11, 2018

(65) Prior Publication Data

US 2019/0051161 A1 Feb. 14, 2019

Related U.S. Application Data

(60) Provisional application No. 62/544,539, filed on Aug. 11, 2017.

(51) Int. Cl.
*G08G 1/01* (2006.01)
*G08G 1/08* (2006.01)
(Continued)

(52) U.S. Cl.
CPC .......... *G08G 1/0145* (2013.01); *G06N 20/00* (2019.01); *G08G 1/015* (2013.01); *G08G 1/0116* (2013.01);
(Continued)

(58) Field of Classification Search
CPC .. G08G 1/0116; G08G 1/0129; G08G 1/0145; G08G 1/015; G08G 1/08; G08G 1/081; G06N 20/00
(Continued)

(56) References Cited

U.S. PATENT DOCUMENTS

| | | |
|---|---|---|
| 4,833,469 A | 5/1989 | David |
| 5,111,401 A | 5/1992 | Everett et al. |

(Continued)

FOREIGN PATENT DOCUMENTS

| | | |
|---|---|---|
| CN | 100533151 | 8/2009 |
| CN | 101799987 | 8/2010 |

(Continued)

OTHER PUBLICATIONS

U.S. Appl. No. 16/030,396, William A. Malkes, System and Method Adaptive Controlling of Traffic Using Camera Data, filed Jul. 9, 2018.

(Continued)

*Primary Examiner* — Atul Trivedi
(74) *Attorney, Agent, or Firm* — Kilpatrick Townsend & Stockton, LLP (57) ABSTRACT

Systems and methods of adaptive traffic control based on detected anomalies in traffic conditions are disclosed. One aspect of the present disclosure is a method of adaptive traffic control that includes receiving traffic data at an intersection; determining statistics associated with traffic at the intersection based on the traffic data; detecting an anomaly in the traffic based on the statistics; determining an anomaly rule based on a portion of the statistics associated with the traffic at the intersection over at least one time interval prior to detection of the anomaly; and utilizing the anomaly rule to adaptively control the traffic at the intersection to prevent future occurrences of the anomaly at the intersection.

20 Claims, 7 Drawing Sheets

(51) Int. Cl.
   *G08G 1/015* (2006.01)
   *G06N 20/00* (2019.01)
   *G08G 1/081* (2006.01)
(52) U.S. Cl.
   CPC .............. *G08G 1/0129* (2013.01); *G08G 1/08* (2013.01); *G08G 1/081* (2013.01)
(58) Field of Classification Search
   USPC ........................................................ 701/117
   See application file for complete search history.

(56) References Cited

U.S. PATENT DOCUMENTS

| | | | |
|---|---|---|---|
| 5,208,584 A | 5/1993 | Kaye et al. | |
| 5,406,490 A | 4/1995 | Braegas | |
| 5,444,442 A | 8/1995 | Sadakata et al. | |
| 6,064,139 A | 5/2000 | Ozawa et al. | |
| 6,075,874 A | 6/2000 | Higashikubo et al. | |
| 6,317,058 B1 | 11/2001 | Lemelson et al. | |
| 6,366,219 B1 | 4/2002 | Hoummady | |
| 6,405,132 B1* | 6/2002 | Breed ................... | B60N 2/002 |
| | | | 701/301 |
| 6,505,046 B1 | 1/2003 | Baker | |
| 6,526,352 B1 | 2/2003 | Breed et al. | |
| 6,720,920 B2 | 4/2004 | Breed et al. | |
| 6,741,926 B1 | 5/2004 | Zhao et al. | |
| 6,751,552 B1 | 6/2004 | Minelli | |
| 6,768,944 B2 | 7/2004 | Breed et al. | |
| 6,862,524 B1 | 3/2005 | Nagda et al. | |
| 6,937,161 B2 | 8/2005 | Nishimura | |
| 7,110,880 B2 | 9/2006 | Breed et al. | |
| 7,610,146 B2 | 10/2009 | Breed | |
| 7,630,806 B2 | 12/2009 | Breed | |
| 7,698,055 B2 | 4/2010 | Horvitz et al. | |
| 7,698,062 B1 | 4/2010 | McMullen et al. | |
| 7,821,421 B2 | 10/2010 | Tamir et al. | |
| 7,835,859 B2 | 11/2010 | Bill | |
| 7,899,611 B2 | 3/2011 | Downs et al. | |
| 7,979,172 B2 | 7/2011 | Breed | |
| 8,050,863 B2 | 11/2011 | Trepagnier et al. | |
| 8,135,505 B2 | 3/2012 | Vengroff et al. | |
| 8,144,947 B2 | 3/2012 | Kletter | |
| 8,212,688 B2 | 7/2012 | Morioka et al. | |
| 8,255,144 B2 | 8/2012 | Breed et al. | |
| 8,373,582 B2 | 2/2013 | Hoffberg | |
| 8,395,529 B2* | 3/2013 | Seder ................... | G01S 13/723 |
| | | | 340/905 |
| 8,566,029 B1 | 10/2013 | Lopatenko et al. | |
| 8,589,069 B1 | 11/2013 | Lehman | |
| 8,682,812 B1 | 3/2014 | Ran | |
| 8,706,394 B2 | 4/2014 | Trepagnier et al. | |
| 8,825,350 B1 | 9/2014 | Robinson | |
| 8,885,929 B2* | 11/2014 | Ni ....................... | G08G 1/0175 |
| | | | 382/159 |
| 8,903,128 B2 | 12/2014 | Shet et al. | |
| 9,043,143 B2 | 5/2015 | Han | |
| 9,174,650 B2* | 11/2015 | Reilhac ............. | B60W 50/0098 |
| 9,387,928 B1 | 7/2016 | Gentry et al. | |
| 9,672,734 B1* | 6/2017 | Ratnasingam .......... | H04L 67/12 |
| 9,965,951 B1 | 5/2018 | Gallagher et al. | |
| 10,083,607 B2* | 9/2018 | Ginsberg ............... | G08G 1/081 |
| 2004/0155811 A1 | 8/2004 | Albero et al. | |
| 2005/0187708 A1 | 8/2005 | Joe et al. | |
| 2007/0162372 A1 | 7/2007 | Anas | |
| 2007/0208494 A1 | 9/2007 | Chapman et al. | |
| 2007/0273552 A1 | 11/2007 | Tischer | |
| 2008/0071465 A1* | 3/2008 | Chapman ........... | G01C 21/3691 |
| | | | 701/117 |
| 2008/0094250 A1 | 4/2008 | Myr | |
| 2008/0195257 A1 | 8/2008 | Rauch | |
| 2009/0048750 A1 | 2/2009 | Breed | |
| 2009/0051568 A1 | 2/2009 | Corry et al. | |
| 2011/0037618 A1 | 2/2011 | Ginsberg et al. | |
| 2011/0080303 A1* | 4/2011 | Goldberg ................ | G08G 1/07 |
| | | | 340/909 |
| 2011/0205086 A1 | 8/2011 | Lamprecht et al. | |
| 2012/0038490 A1 | 2/2012 | Verfuerth | |
| 2012/0112928 A1 | 5/2012 | Nishimura et al. | |
| 2014/0136414 A1 | 5/2014 | Abhyanker | |
| 2014/0277986 A1 | 9/2014 | Mahler et al. | |
| 2016/0031450 A1* | 2/2016 | Wilson ................... | G09B 19/10 |
| | | | 701/23 |
| 2016/0049079 A1* | 2/2016 | Ibrahim ................. | G08G 1/005 |
| | | | 340/944 |
| 2016/0232785 A1* | 8/2016 | Wang ..................... | G08G 1/012 |
| 2016/0371489 A1* | 12/2016 | Puri ...................... | G06F 21/554 |
| 2016/0379486 A1* | 12/2016 | Taylor .................. | G08G 1/0141 |
| | | | 340/905 |
| 2017/0053461 A1* | 2/2017 | Pal ........................ | H04W 4/029 |
| 2017/0116851 A1* | 4/2017 | Burke .................. | G08G 1/0112 |
| 2017/0169309 A1 | 6/2017 | Reddy et al. | |
| 2017/0352264 A1* | 12/2017 | Thalanany ............. | H04W 4/029 |
| 2018/0075739 A1 | 3/2018 | Ginsberg et al. | |
| 2018/0174446 A1* | 6/2018 | Wang ................... | G08G 1/0112 |
| 2018/0190111 A1* | 7/2018 | Green ................... | G08G 1/081 |
| 2019/0005812 A1* | 1/2019 | Matus ................. | G08G 1/0967 |
| 2019/0043355 A1* | 2/2019 | Ferguson ............... | G08G 1/143 |
| 2019/0049264 A1 | 2/2019 | Malkes | |
| 2019/0050647 A1 | 2/2019 | Malkes | |
| 2019/0051152 A1 | 2/2019 | Malkes | |
| 2019/0051160 A1 | 2/2019 | Malkes | |
| 2019/0051162 A1 | 2/2019 | Malkes | |
| 2019/0051163 A1 | 2/2019 | Malkes | |
| 2019/0051164 A1 | 2/2019 | Malkes | |
| 2019/0051167 A1 | 2/2019 | Malkes | |
| 2019/0051171 A1 | 2/2019 | Malkes | |
| 2019/0206254 A1* | 7/2019 | Tao ........................ | G08G 1/164 |

FOREIGN PATENT DOCUMENTS

| | | |
|---|---|---|
| CN | 101944295 | 1/2011 |
| EP | 0 464 821 | 1/1992 |
| KR | 2013-0067847 | 6/2013 |

OTHER PUBLICATIONS

U.S. Appl. No. 16/044,891, William A. Malkes, System and Method for Controlling Vehicular Traffic, filed Jul. 25, 2018.
U.S. Appl. No. 16/058,106, William A. Malkes, System and Method for Managing Traffic by Providing Recommendations to Connected Objects, filed Aug. 8, 2018.
U.S. Appl. No. 16/059,814, William A. Malkes, System and Method of Navigation Vehicles, filed Aug. 9, 2018.
U.S. Appl. No. 16/030,396, William A. Malkes, Systems and Methods of Adaptive Traffic Optimization Using Unmanned Aerial Vehicles, filed Aug. 9, 2018.
U.S. Appl. No. 16/058,214, William A. Malkes, System and Method of Adaptive Traffic Management, filed Aug. 8, 2018.
U.S. Appl. No. 16/100,750, William A. Malkes, System and Method of Adaptive Traffic Management at an Intersection, filed Aug. 10, 2018.
U.S. Appl. No. 16/101,766, William A. Malkes, System and Method for Retail Revenue Based Traffic Management, filed Aug. 10, 2018.
U.S. Appl. No. 16/101,933, William A. Malkes, Adaptive Optimization of Navigational Routes Using Traffic Data, filed Aug. 13, 2018.
U.S. Appl. No. 16/058,343, William A. Malkes, System and Method of Adaptive Controlling of Traffic Using Zone Based Occupancy, filed Aug. 8, 2018.
U.S. Appl. No. 16/030,396, Office Action dated Nov. 20, 2018.
U.S. Appl. No. 16/058,343 Office Action dated Nov. 19, 2018.
Dehghan et al., Afshin; "Automatic Detection and Tracking of Pedestrians in Videos with Various Crowd Densities", Pedestrian and Evacuation Dynamics 2012.
Dubska et al.; "Automatic Camera Calibration for Traffic Understanding", bmva.org, 2014.
Grosser, Kari; "Smart Io T Technologies for Adaptive Traffic Management Using a Wireless Mes Sensor Network", Advantech Industrial Io T Blog, Feb. 3, 2017.
https://www.flir.com, 2018.

(56) References Cited

OTHER PUBLICATIONS

Halper, Mark; Smart Cameras Will Help Spokane Light It's World More Intelligently (Updated), LEDs Magazine, and Business/Energy/Technology Journalist, Apr. 19, 2017.

Heaton, Brian; "Smart Traffic Signals Get a Green Light", Government Technology Magazine, Feb. 15, 2012.

Kolodny, Lora; Luminar reveals sensors that could make self-driving cars safer than human, Techcrunch, Apr. 13, 2017.

McDermott, John; "Google's newest secret weaon for local ads", Digiday, Jan. 29, 2014.

Resnick, Jim; "How Smart Traffic Signals May Ease Your Commute", BBC, Autos, Mar. 18, 2015.

Sun et al., M.; "Relating Things and Stuff via Object Property Interactions", cvgl.stanford.edu, Sep. 4, 2012.

Whitwam, Ryan; "How Google's self-driving cars detect and avoid obstacles", ExtremeTech, Sep. 8, 2014.

Yamaguchi, Jun'ichi; "Three Dimensional Measurement Using Fisheye Stereo Vision", Advances in Theory and Applications of Stereo Vision, Dr. Asim Bhatti (Ed.), ISBN:978-953-307-516-7, InTech. Jan. 8, 2011.

\* cited by examiner

| Time Period (2 min. intervals) | Average Intersection Flow Rate (Vehicle/Min.) | Zone A Traffic Flow Rate (Vehicle/Min.) | Zone B Traffic Flow Rate (Vehicle/Min.) | Zone A Vehicle Type | Zone B Vehicle Type | Zone A Light Phase – Right Turn | Zone A Light Phase – Left turn & Straight | Zone B Light Phase – Right turn | Zone B Light Phase – Left Turn & Straight |
|---|---|---|---|---|---|---|---|---|---|
| 1 | 10 | 9 | 11 | Motorcycle | Truck | Green | Green | Green | Red |
| 2 | 10 | 11 | 9 | Motorcycle | Truck | Red | Red | Green | Green |
| 3 | 2 | 2 | 2 | Truck | Truck | Red | Red | Red | Red |
| 4 | 10 | 9 | 11 | Car | Car | Green | Red | Red | Red |
| 5 | 10 | 11 | 9 | Car | Car | Green | Green | Green | Red |
| 6 | 15 | 14 | 16 | Car | Truck | Red | Red | Green | Green |
| 7 | 0 | 0 | 0 | Car | Car | Green | Red | Green | Red |
| 8 | 0 | 0 | 0 | Car | Car | Red | Red | Green | Green |
| 9 | 1 | 0 | 2 | Car | Motorcycle | Green | Green | Green | Red |
| 10 | 0 | 0 | 0 | Car | Car | Red | Red | Green | Green |
| ... | ... | ... | ... | ... | ... | ... | ... | ... | ... |
| 15 | 12 | 11 | 13 | Motorcycle | Car | Green | Green | Green | Red |
| 16 | 0 | 0 | 0 | Car | Car | Red | Red | Green | Green |

ADAPTIVE TRAFFIC CONTROL USING OBJECT TRACKING AND IDENTITY DETAILS

CROSS-REFERENCE TO RELATED APPLICATIONS

This application claims priority to U.S. Provisional Patent Application No. 62/544,539 filed on Aug. 11, 2017, the entire content of which is incorporated herein by reference.

FIELD OF THE DISCLOSURE

The present disclosure is generally related to traffic control systems, and more particularly related to adaptive traffic control of traffic based on object identification.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Driving a vehicle can be dangerous and requires various motor skills in order to minimize the risk of an accident, such as visual perception, judgement, attentiveness, and decision making Every year The Federal Highway Administration (FHA) reports approximately 2.5 Million intersection accidents, i.e. 40 percent of all accidents recoded nationally. Traditional measures to reduce crashes include improved geometric design, congestion management strategies, as well as better driver education and enforcement. While such measures are generally effective, they are often not feasible to implement.

An accident can be an example of an anomaly in traffic, which can result in blockage of traffic movement that in turn leads to wasted fuel and time. Current traffic light systems have no provisions for preventing such anomalies from occurring and/or managing the traffic in cases of anomalies such as vehicular accidents and traffic blockage on roads. The traffic light systems are updated manually, or often not at all, after occurrence of such events. Such management of the traffic control systems requires either significant effort, resulting in lost time and energy, or accepts lost traffic efficiency.

Thus, an improved and efficient traffic light system is required that could automatically manage despite occurrences of vehicular accidents and traffic blockage.

SUMMARY

One or more example embodiments of inventive concepts are directed to providing adaptive traffic control mechanisms at an intersection (or a group of intersections in vicinity of each other) based on detecting anomalies in traffic conditions.

One aspect of the present disclosure is a method of adaptive traffic control includes receiving traffic data at an intersection; determining statistics associated with traffic at the intersection based on the traffic data; detecting an anomaly in the traffic based on the statistics; determining an anomaly rule based on a portion of the statistics associated with the traffic at the intersection over at least one time interval prior to detection of the anomaly; and utilizing the anomaly rule to adaptively control the traffic at the intersection to prevent future occurrences of the anomaly at the intersection.

One aspect of the present disclosure is a traffic controller with memory having computer-readable instructions stored thereon and one or more processors. The one or more processors are configured to execute the computer-readable instructions to receive traffic data at an intersection; determine statistics associated with traffic at the intersection based on the traffic data; detect an anomaly in the traffic based on the statistics; determine an anomaly rule based on a portion of the statistics associated with the traffic at the intersection over at least one time interval prior to detection of the anomaly; and utilize the anomaly rule to adaptively control the traffic at the intersection to prevent future occurrences of the anomaly at the intersection.

One aspect of the present disclosure includes one or more computer-readable medium having computer-readable instructions stored thereon, which when executed by one or more processors, cause the one or more processors to receive traffic data at an intersection; determine, for each of a plurality of time intervals and based on the traffic data, corresponding statistics associated with traffic at the intersection based on the traffic data; detect an anomaly in the traffic for at least two of the plurality of time intervals, consecutively; generate an anomaly scenario based on statistics determined for at least one of the time intervals preceding the first one of the at least two consecutive ones of the plurality of time intervals; determine an anomaly rule for the anomaly scenario; and send the anomaly rule to a light controller to adaptively control the traffic at the intersection to prevent future occurrences of the anomaly at the intersection.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some example embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of example embodiments of the present disclosure, the preferred, systems and methods are now described.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

Figure 1:
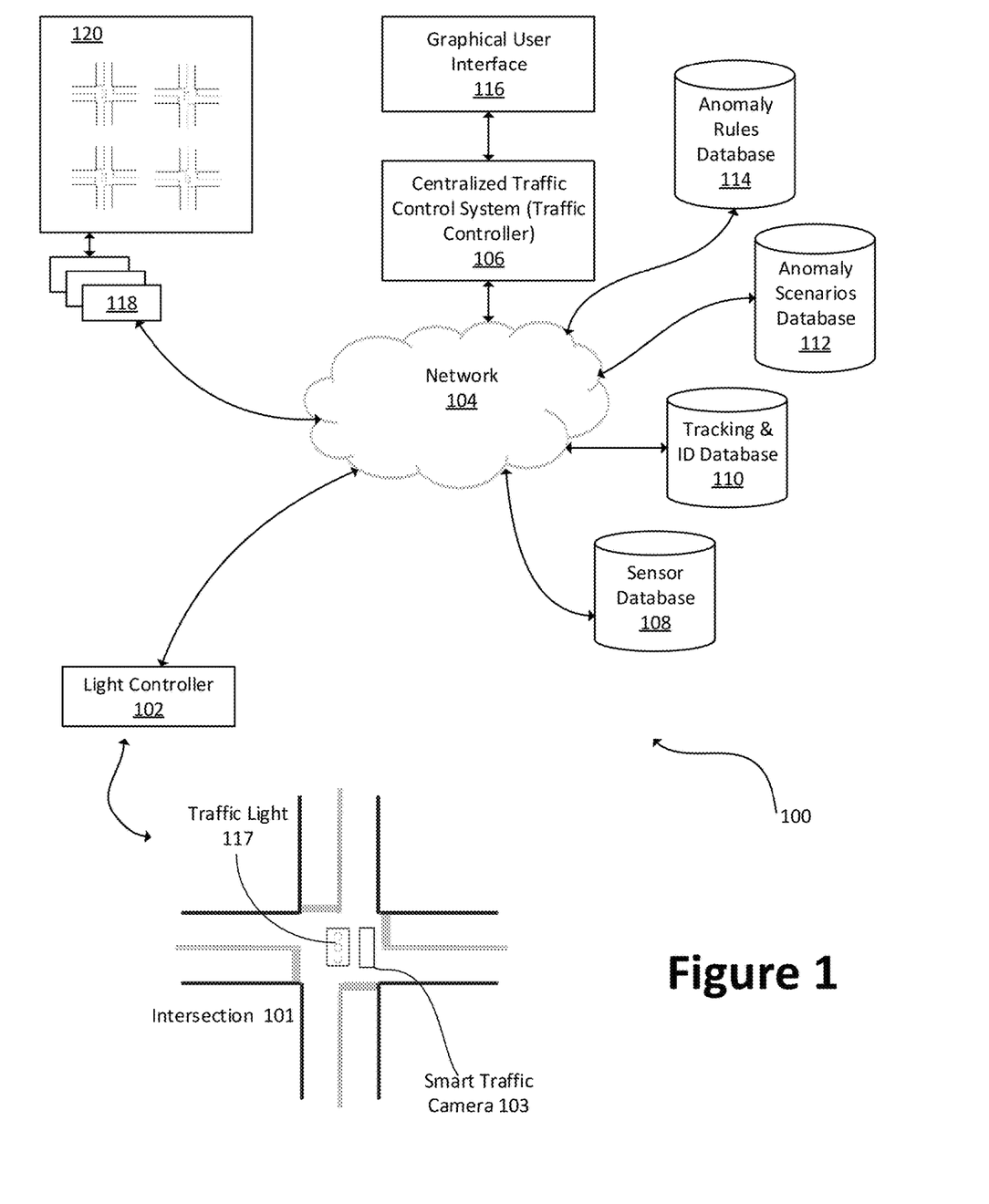
FIG. 1 illustrates a system for adaptive controlling of traffic, according to one example embodiment.

FIG. 1 illustrates a system for adaptive controlling of traffic, according to one example embodiment. The system 100 comprises various components including but not limited to, a traffic light controller 102 (hereinafter may be referred to as a light controller 102) associated with a smart traffic camera 103 and traffic light 117 installed at an intersection 101. Components of the traffic controller 102 will be further described with reference to FIG. 2. The traffic controller 102 may or may not be physically located near the smart traffic camera 103 or the traffic light 117. In one example embodiment, the traffic light 117 associated with the light controller 102 can have different traffic signals directed towards all the roads/zones leading to the intersection 101. The different signals may comprise a Red light, a Yellow light, and a Green light.

There may be more than one smart traffic camera 103 or one traffic light 117 installed at intersection 101. The smart traffic camera 103 may be one various types of cameras, including but not limited, to fisheye traffic cameras to detect and optimize traffic flows at the intersection 101 and/or at other intersections part of the same local network or corridor. The smart traffic camera 103 can be any combination of cameras or optical sensors, such as but not limited to fish-eye cameras, directional cameras, infrared cameras, etc. The smart traffic camera 103 can allow for other types of sensors to be connected to thereto (e.g., via various known or to be developed wired and/or wireless communication schemes) for additional data collection. The smart traffic camera 103 can collect video and other sensor data at the intersection 101 and convey the same to the traffic controller 102 for further processing, as will be described below.

The light controller 102 can manage and control traffic for all zones (directions) at which traffic enters and exits the intersection 101. Examples of different zones of the intersection 101 are illustrated in FIG. 1 (e.g., zones A, B, C and D). Therefore, while FIG. 1 only depicts a single smart traffic camera 103 and a single traffic light 117, there can be multiple ones of the smart traffic camera 103 and traffic lights 117 installed at the intersection 101 for managing traffic for different zones of the intersection 101.

The system 100 may further include network 104. The network 104 can enable the light controller 102 to communicate with a remote traffic control system 106 (which may be referred to as a centralized traffic control system or simply a traffic controller 106). The network 104 can be any known or to be developed cellular, wireless access network and/or a local area network that enables communication (wired or wireless) among components of the system 100. As mentioned above, the light controller 102 and the traffic controller 106 can communicate via the network 104 to exchange data, created traffic rules or control settings, etc., as will be described below.

The traffic controller 106 can be a centralized system used for managing and controlling traffic lights and conditions at multiple intersections (in a given locality, neighborhood, an entire town, city, state, etc.).

The traffic controller 106 can be communicatively coupled (e.g., via any known or to be developed wired and/or wireless network connection such as network 104) to one or more databases such as a sensor database 108 used to store data from the smart traffic camera 103 (and/or traffic sensor(s) 206, which will be discussed below with reference to FIG. 2) and a tracking and identity database 110 used to store data from tracking and identification of objects at the intersection 101. The traffic controller 106 may also be communicatively coupled to an anomaly scenario database 112 used to store data identified as an anomaly in traffic conditions at the intersection 101. The traffic controller 106 may also be communicatively coupled to an anomaly rules database 114 used to store parameters, defining traffic scenarios identified as potentially preceding (leading to) an anomaly. The use and functionality of these example databases will be further described below with reference to FIGS. 2-7.

The traffic controller 106 can provide a centralized platform for network operators to view and manage traffic conditions, set traffic control parameters and/or manually override any traffic control mechanisms at any given intersection. An operator can access and use the traffic controller 106 via a corresponding graphical user interface 116 after providing logging credentials and authentication of the same by the traffic controller 106. The traffic controller 106 can be controlled, via the graphical user interface 116, by an operator to receive traffic control settings and parameters to apply to one or more designated intersections. The traffic controller 106 can also perform automated and adaptive control of traffic at the intersection 101 or any other associated intersection based on analysis of traffic conditions, data and statistics at a given intersection(s) using various algorithms and computer-readable programs such as known or to be developed machine learning algorithms. The components and operations of traffic controller 106 will be further described below with reference to FIGS. 4-6.

Traffic controller 106 can be a cloud based component running on a public, private and/or a hybrid cloud service/infrastructure provided by one or more cloud service providers.

The system 100 can also have additional intersections and corresponding light controllers associated therewith. Accordingly, not only the traffic controller 106 is capable of adaptively controlling the traffic at an intersection based on traffic data at that particular intersection but it can further adapt traffic control parameters for that particular intersection based on traffic data and statistics at nearby intersections communicatively coupled to the traffic controller 106.

As shown in FIG. 1, the light controllers 118 can be associated with one or more traffic lights at one or more of the intersections 120 and can function in a similar manner as the light controller 102 and receive anomaly rules and traffic control settings from the traffic controller 106 for managing traffic at the corresponding one of intersections 120. Alternatively, any one of the light controllers 118 can be a conventional light controller implementing pre-set traffic control settings at the corresponding traffic lights but configured to convey corresponding traffic statistics to the traffic controller 106.

The intersections 120 can be any number of intersections adjacent to the intersection 101, within the same neighborhood or city as the intersection 101, intersections in another city, etc.

In one or more examples, the light controller 102 and the traffic controller 106 can be the same (one component implementing the functionalities of both). In such example, components of each described below with reference to FIGS. 2 and 3 may be combined into one. Furthermore, in such example, the light controller 102 may be remotely located relative to the smart traffic camera 103 and the traffic light 117 and be communicatively coupled thereto over a communication network such as the network 104.

As mentioned above, the components of the system 100 can communicate with one another using any known or to be developed wired and/or wireless network. For example, for wireless communication, techniques such as Visible Light Communication (VLC), Worldwide Interoperability for Microwave Access (WiMAX), Long Term Evolution (LTE), Fifth Generation (5G) cellular, Wireless Local Area Network (WLAN), Infrared (IR) communication, Public Switched Telephone Network (PSTN), Radio waves, and other communication techniques known, or to be developed, in the art may be utilized.

While certain components of the system 100 are illustrated in FIG. 1, inventive concepts are not limited thereto and the system 100 may include any number of additional components necessary for operation and functionality thereof.

Having described components of an example system 100, the disclosure now turns to description of one or more examples of components of the light controller 102 and the traffic controller 106.

Figure 2:
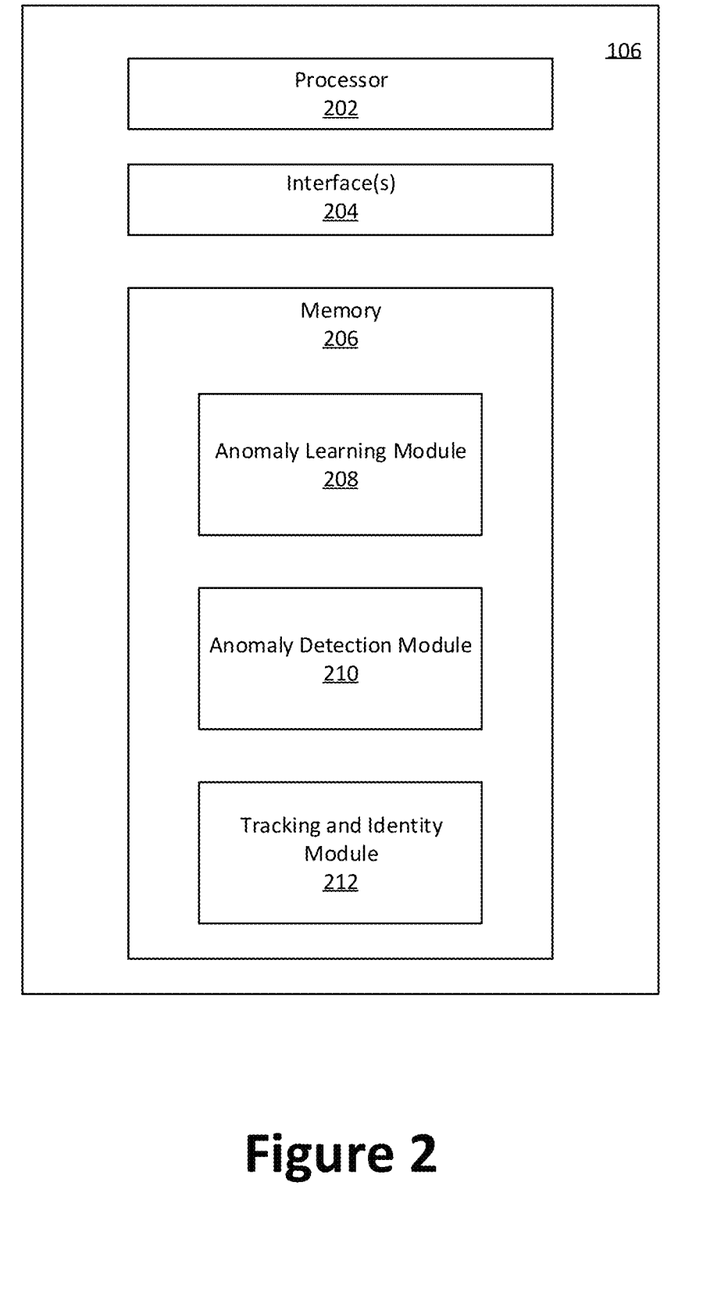
FIG. 2 is a block diagram showing different components of the traffic controller of FIG. 1, according to one example embodiment.

FIG. 2 is a block diagram showing different components of the traffic controller of FIG. 1, according to one example embodiment.

The traffic controller 106 can comprise one or more processors such as a processor 202, interface(s) 204 and one or more memories such as a memory 206. The processor 202 may execute an algorithm stored in the memory 206 for adaptive traffic control based on detection of anomalies, as will be described below. The processor 202 may also be configured to decode and execute any instructions received from one or more other electronic devices or server(s). The processor 202 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 202 may be configured to execute one or more computer-readable program instructions, such as program instructions to carry out any of the functions described in this description.

The interface(s) 204 may assist an operator in interacting with the traffic controller 106. The interface(s) 204 of the traffic controller 106 can be used instead of or in addition to the graphical user interface 116 described above with reference to FIG. 1. In another example, the interface(s) 204 can be the same as the graphical user interface 116. The interface(s) 204 either accept an input from the operator or provide an output to the operator, or may perform both the actions. The interface(s) 204 may either be a Command Line Interface (CLI), Graphical User Interface (GUI), voice interface, and/or any other user interface known in the art or to be developed.

The memory 206 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 206 may include computer-readable instructions, which when executed by the processor 202 cause the traffic controller 106 to perform adaptive traffic control based on anomaly detection in traffic patterns. The computer-readable instructions stored in the memory 206 can be identified as anomaly learning module (service) 208, anomaly detection module (service) 210, and tracking and identity (ID) module (service) 212. The functionalities of each of these modules, when executed by the processor 202 will be further described below with reference to FIG. 4-6.

Figure 3:
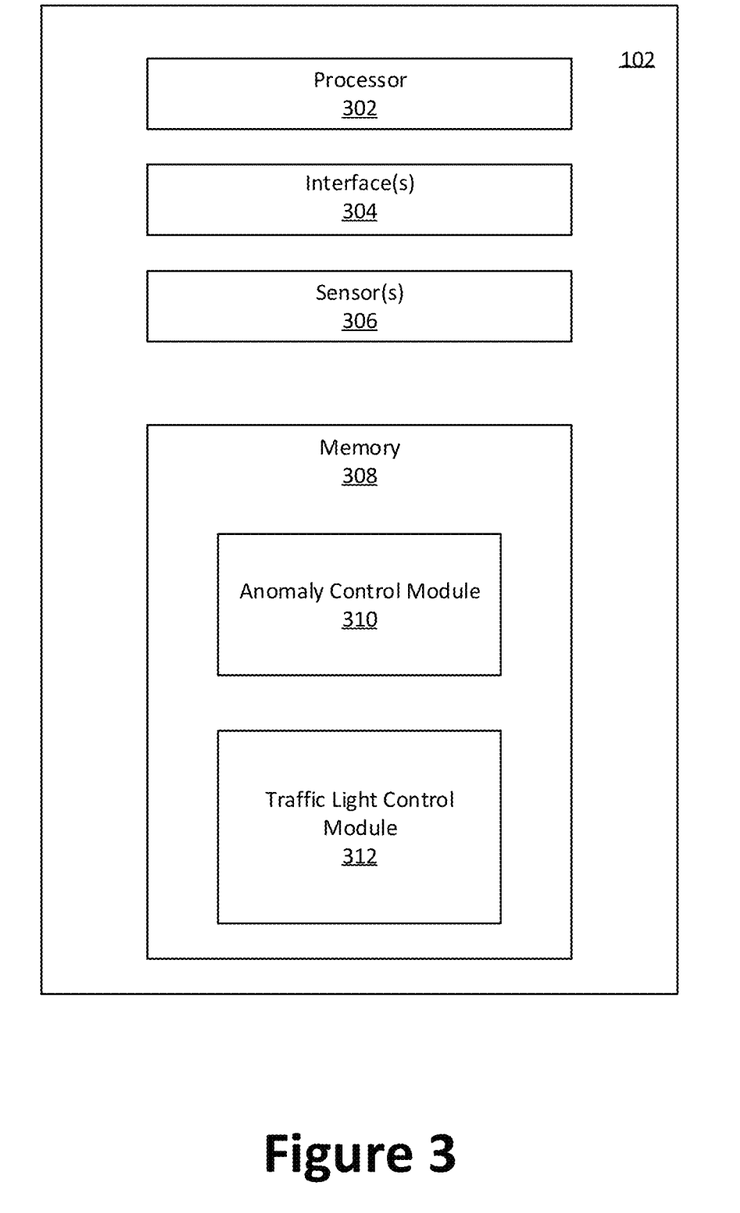
FIG. 3 is a block diagram showing different components of the light controller of FIG. 1, according to one example embodiment

FIG. 3 is a block diagram showing different components of the light controller of FIG. 1, according to one example embodiment. As mentioned above, the light controller 102 can be physically located near the smart traffic camera 103 and/or the traffic light 117 (e.g., at a corner of the intersection 101) or alternatively can communicate with the smart traffic camera 103 and/or the traffic light 117 wirelessly or via a wired communication scheme (be communicatively coupled thereto).

The light controller 102 can comprise one or more processors such as a processor 302, interface(s) 304, sensor(s) 306, and one or more memories such as a memory 308. The processor 302 may execute an algorithm stored in the memory 308 for adaptive traffic control, as will be described below. The processor 302 may also be configured to decode and execute any instructions received from one or more other electronic devices or server(s). The processor 302 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 302 may be configured to execute one or more computer-readable program instructions, such as program instructions to carry out any of the functions described in this description.

The interface(s) 304 may assist an operator in interacting with the light controller 102. The interface(s) 304 of the light controller 102 may be used instead of or in addition to the graphical user interface 116 described with reference to FIG. 1. In one example, the interface(s) 304 can be the same as the graphical user interface 116. The interface(s) 304 either accept an input from the operator or provide an output to the operator, or may perform both actions. The interface(s) 304 may either be a Command Line Interface (CLI), Graphical User Interface (GUI), voice interface, and/or any other user interface known in the art or to be developed.

The sensor(s) 306 can be one or more smart cameras such as fish-eye cameras mentioned above or any other type of sensor/capturing device that can capture various types of data (e.g., audio/visual data) regarding activities and traffic patterns at the intersection 101. Any one such sensor 306 can be located at the intersection 101 and coupled to the traffic controller 102 and/or the traffic light 117.

As mentioned, the sensor(s) 306 may be installed to capture objects moving across the roads. The sensor(s) 306 used may include, but are not limited to, optical sensors such as fish-eye camera mentioned above, Closed Circuit Television (CCTV) camera and Infrared camera. Further, sensor(s) 306 can include, but not limited to induction loops, Light Detection and Ranging (LIDAR), radar/microwave, weather sensors, motion sensors, audio sensors, pneumatic road tubes, magnetic sensors, piezoelectric cable, and weigh-in motion sensor, which may also be used in combination with the optical sensor(s) or alone.

The memory 308 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 308 may include computer-readable instructions, which when executed by the processor 302 cause the light controller 102 to perform adaptive traffic control based on anomaly detection in traffic patterns. The computer-readable instructions stored in the memory 308 can be identified as traffic anomaly control module (service) 310 and traffic light control module (service) 312. The functionalities of each of these modules, when executed by the processor 302 will be further described below with reference to FIG. 7.

As mentioned above, light controller 102 and traffic controller 106 may form a single physical unit, in which case system components of each, as described with reference to FIGS. 1 to 3 may be combined into one (e.g., all example modules described above with reference to FIGS. 2 and 3 may be stored on a single memory such as the memory 206 or the memory 308).

While certain components have been shown and described with reference to FIGS. 2 and 3, the components of the light controller 102 and/or the traffic controller 106 are not limited thereto, and can include any other component for proper operations thereof including, but not limited to, a transceiver, a power source, etc.

Having described an example system and example components of one or more elements thereof with reference to FIGS. 1-3, the disclosure now turns to the description of examples for detecting anomalies in traffic patterns and adaptive traffic control based thereon.

Example embodiments, which will be described below with reference to FIGS. 4-7, enable the traffic controller 106 to detect anomalies (traffic anomalies) in traffic conditions/flows at the intersection 101. The traffic controller 106 may be able to track various types of statistics before an anomaly is detected and use this data to identify scenarios that are likely to result in a future anomaly. By proactively, predicting the likely anomaly, the traffic controller 106 can adapt traffic control settings to prevent the anomaly from occurring.

For example, an anomaly may be a sudden drop in a rate of traffic flow at the intersection 101 due to any number of reasons including an accident, weather conditions, a sudden emergency, a nearby event, presence of particular objects at the intersection 101, etc.

For example, the analysis of traffic statistics preceding a sudden drop in the rate of traffic flow and historical data suggests that typically, the presence of 3 trucks travelling south bound toward the intersection 101 and intending to make a left turn at the intersection 101 results in the detected anomaly (traffic flow rate of only 7 vehicles per minute in the same direction). This analysis may also take into consideration time of day, a scheduled event, weather conditions, etc. For example, the detection of 3 trucks travelling south bound toward the intersection 101 and intending to make a left turn at the intersection 101 at 6 PM, when there is a snow storm and/or when a nearby baseball game is underway, results in an anomaly (e.g., traffic flow rate of only 3 vehicles per minute in the same direction).

Therefore, the traffic controller 106 can determine that the length of the corresponding green light for the left turn signal at the intersection 101 may be too short and thus can create a rule for when 3 trucks are detected traveling south bound and making a left turn at the intersection 101. The rule may be to extend the left turn green signal by 10 seconds. Thereafter, upon detection of 3 trucks traveling southbound and making a left turn, the traffic controller 106 can direct the light controller 102 to proactively adjust the green light by 10 seconds to avoid the anomaly.

Figure 4:
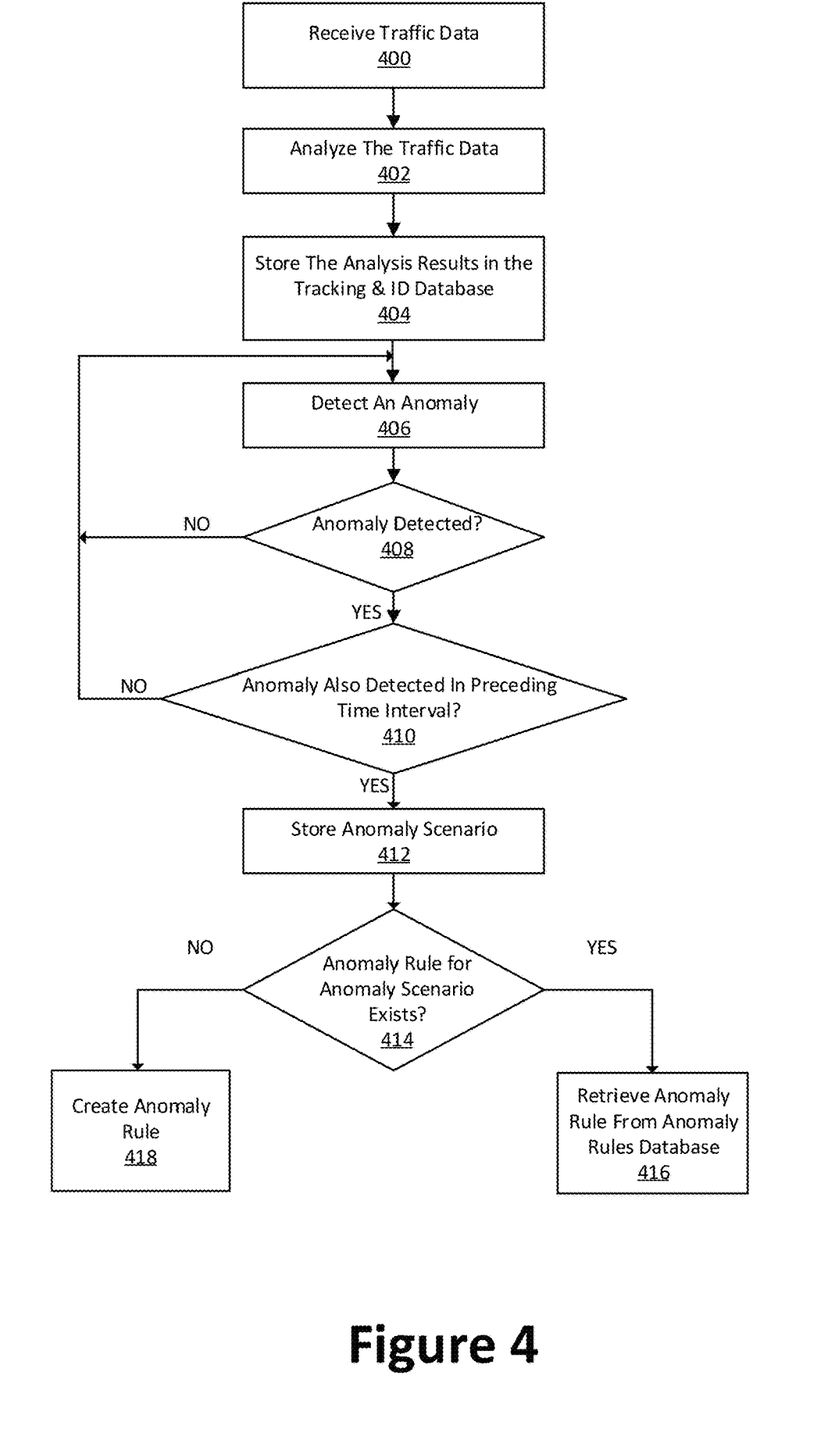
FIG. 4 illustrates a flowchart showing a method executed by the traffic controller of FIG. 1, according to one example embodiment.

Hereinafter, the process of detecting anomalies and establishing rules therefore by the traffic controller 106 will be described. FIG. 4 illustrates a flowchart showing a method executed by the traffic controller of FIG. 1, according to one example embodiment. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 4 will be described from the perspective of the traffic controller 106. However, it will be understood that the functionalities of the traffic controller 106 are implemented by the processor 202 executing computer-readable instructions stored on the memory 206 described with reference to FIG. 2.

At step 400, the traffic controller 106 may receive traffic data corresponding to the traffic flow at the intersection 101. The traffic data may be captured by the smart traffic camera 103 and/or sensor(s) 306 as described above and transmitted to the traffic controller 106. The traffic data can include, but is not limited to, audio, video and image data corresponding to traffic flowing through the intersection 101. In one example, the traffic data is continuously captured and stored in the sensor database (video data database) 108 and is subsequently retrieved from the sensor database 108 by the traffic controller 106. Alternatively, the traffic data stored in the sensor database 108 is automatically fetched to the traffic controller 106 every predetermined period of time (e.g., where the period of time is a configurable parameter determined based on experiments and/or empirical studies, provided by an operator via the graphical user interface 116, etc.).

At step 402, the traffic controller 106 may analyze the traffic data to identify and track statistics/traffic conditions (e.g., object types) at the intersection 101. The traffic controller 106 may perform the analysis by executing the computer-readable instructions corresponding to the tracking and ID module 212. The detection of the types of objects can be based on determining salient points block measurement or any other known or to be developed method of image/video processing for detecting object types in captured video/image data. The types of objects may include, but are not limited to, pedestrians and various types of transportation means (vehicles) such as cars, trucks, buses, bikes, etc. Furthermore, cars, trucks, buses and bikes can further be broken down into sub-categories. For example, cars can be categorized into sedans, vans, SUVs, etc. Trucks can be categorized into light trucks such as pickup trucks, medium trucks such as box trucks or fire trucks, heavy duty trucks such as garbage trucks, crane movers, 18-wheelers, etc.

Other examples of statistics obtained based on the analysis at step 402 include an average traffic flow rate for an interval of time, light phases for each zone during the interval of time and types of objects in each zone during the same time interval, positions (e.g., x, y and z coordinates) of detected vehicles, etc.

In one or more examples, the traffic controller 106 can store other data in association with the statistics including, but not limited to, time and date, weather conditions, scheduled road maintenances, scheduled events taking place in the vicinity of the intersection 101, etc. The additional information may be obtained from external sources and used in determining anomalies such as the example described above.

At step 404, the traffic controller 106 may store the results of the analysis at step 402 in the tracking and ID database 110 described above with reference to FIG. 1.

Figure 5:
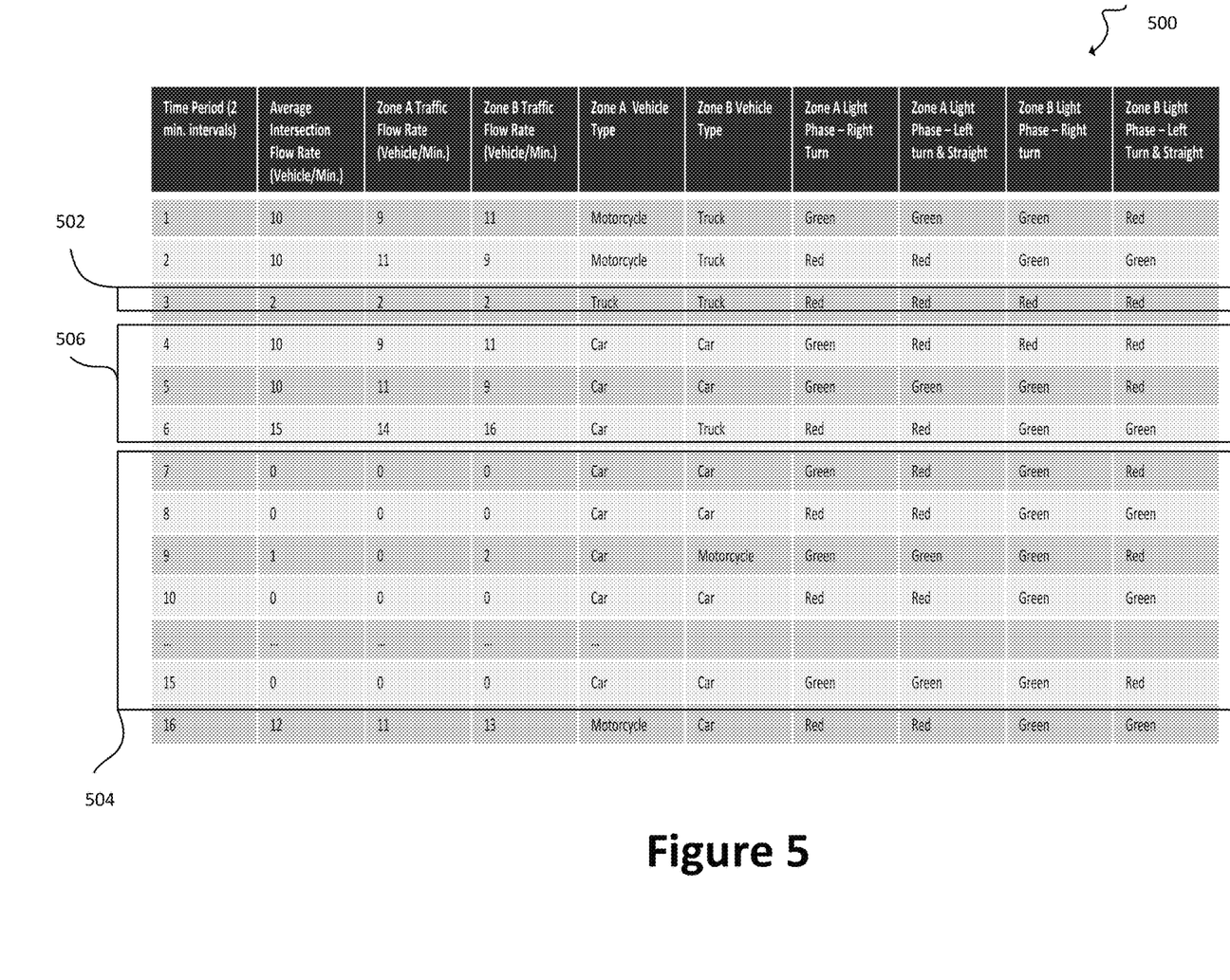
FIG. 5 illustrates an example table of traffic statistics at an intersection, according to one example embodiment.

FIG. 5 illustrates an example table of traffic statistics at an intersection, according to one example embodiment. Table 500 illustrates examples of the analysis of step 402 stored in a tabular format in the tracking and ID database 110.

In the example table 500, statistics associated with the traffic at the intersection 101 are collected for 2-minute time periods for zones A and B at the intersection 101. The statistics, as shown, include average flow rate (traffic flow rate) at the intersection 101, traffic flow rates in zones A and B, types of objects detected in zones A and B, the light phase (e.g., green, yellow or red) for each of the zones A and B. FIG. 5 also illustrates detected anomalies 502 and 504 and anomaly scenario 506, which will be further described below with reference to step 406 of FIG. 4. The table 500 is just a non-limiting example statistics stored in the tracking and ID database 110 and can include more or less relevant statistics for any number of zones of the intersection 101.

In one example, the table 500 is continuously updated with traffic statistics for a given time interval as new traffic data are received and analyzed at steps 400 and 402.

Referring back to FIG. 4, at step 406, the traffic controller 106 may detect an anomaly with respect to the traffic at the intersection 101. In one example, by analyzing the data stored in the tracking and ID database 110, the traffic controller 106 may determine if a traffic flow rate over a given interval of time is equal to or less than a threshold (e.g., equal to or less than 10 vehicles per minute). In another example, the traffic controller 106 can detect an anomaly based on a recorded error in identifying or tracking objects at the intersection 101. For example, when tracking and identifying objects using salient point methods described above, two vehicles may collide resulting in deformation of one or more of them or the two being perceived as one vehicle. Therefore, this error may be indicative of an anomaly (e.g., an accident).

As an example and with reference to FIG. 5, the traffic controller 106 can detect an anomaly 502 at period 3 or anomaly 504 at intervals 7-15 since the average traffic flow rate at the intersection 101 for these periods is equal to or less than 10 vehicles per minute.

At step 408, the traffic controller 106 determines if an anomaly is detected at step 406. If an anomaly is not detected, then the process reverts back to step 406 and the traffic controller proceeds to analyzing the next time interval for possible anomalies. However, if at step 408, the traffic controller 106 determines that an anomaly is detected, then at step 410, the traffic controller 106 determines if the detected anomaly has also been detected for at least one preceding time interval (e.g., two preceding consecutive time intervals).

In one example, the traffic controller 106 may perform steps 406 and/or 408 by executing the computer-readable instructions corresponding to the anomaly learning module 208.

For example and with reference to FIG. 5, at 502, the traffic controller 106 has determined an anomaly for the time period 3 (e.g., average traffic flow rate of 2 which is equal to or less than the example threshold of 10 vehicles per minute). However, this anomaly was not detected for the time period 2. Similarly, at 504, the traffic controller 106 has detected an anomaly for the time period 7 but not for the time period 6. However, for each of time periods 8-15, the traffic controller 106 determines that for at least one preceding time interval, an anomaly has been detected as well.

If at step 410, the traffic controller 106 determines that the anomaly detected at steps 406/408, is not detected for at least one preceding time interval (e.g., for total of at least two consecutive time intervals), the process reverts back to step 406 and the traffic controller 106 proceeds to analyzing the next time interval for possible anomalies (e.g., example of anomaly 502).

However, if at step 410, the traffic controller 106 determines that the anomaly detected at steps 406/408 has been present for at least one preceding time interval (e.g., example of anomaly 504), then at step 412, the traffic controller 106 may store statistics and traffic conditions associated with the traffic flow for at least one time interval prior to the detection of the first instance of the anomaly. The statistics and traffic conditions associated with the traffic flow for at least one time interval prior to the detection of the first instance of the anomaly may be referred to as an anomaly scenario.

For example and with reference to FIG. 5, at step 406, the traffic controller 106 may detect an anomaly for the time interval 8 and subsequently determine at step 410 that the anomaly was also detected for the preceding time interval 7. Therefore, at step 412, the traffic controller 106 may store statistics associated with the traffic flow (anomaly scenario) for at least the time period 6 (at least one time period preceding the first instance of the detected anomaly at time interval 7). In one example, at step 412, the traffic controller 106 may store the anomaly scenario in the anomaly scenario database 112.

FIG. 5 indicates an example anomaly scenario 506. The anomaly scenario 506 may be a scenario which is likely to result in a subsequent anomaly. In other words, the traffic conditions and statistics corresponding to time intervals 4 through 6 may be indicative of a likely anomaly to occur at time interval 7. Therefore, as will be described below, the traffic controller 106 may adjust traffic light settings and phases to avoid the anomaly from occurring.

The anomaly scenario 506 can include a range of statistics such as average traffic flow rates, types of detected objects and traffic signal (phase) statuses of different zones for time intervals 4 through 6. For example, the anomaly scenario 506 can include a range of 10 to 15 vehicles per minute for traffic flow rate at the intersection 101, 9-14 vehicles per minute rate in zone A, 11-16 vehicles per minute rate in zone B, cars in zone A and car/truck in zone B, which may be stored at step 412.

At step 414, the traffic controller 106 may determine if a rule for the anomaly scenario of step 412 already exists in the anomaly rules database 114. The traffic controller 106 can make the determination for an existing rule at step 414 by comparing the anomaly scenario of step 412 to previous anomaly scenarios associated with existing rules stored in the anomaly rules database 114.

If a match is found, then at step 416, the traffic controller 106 may retrieve the existing rule as the rule corresponding to the anomaly scenario of step 412. However, if a match is not found, then at step 418, the traffic controller 106 may create a new rule for the anomaly scenario of step 412.

Existing rules or newly created rules may be user defined (e.g., via the graphical user interface 116 of FIG. 1) or may be automatically determined by the traffic controller 106 using statistical analysis and machine learning tools and algorithms.

For example, a rule may be automatically defined by the traffic controller 106 that whenever the conditions of the example anomaly scenario 506 is detected and in order to prevent the anomaly at the time interval 7, the light phase for the right turn in zone B remains green for an additional 10 seconds or the light phases for left turn and straight signals in zone A stay green for 60 seconds. The created rule may then be stored in the anomaly rules database 114.

Figure 6:
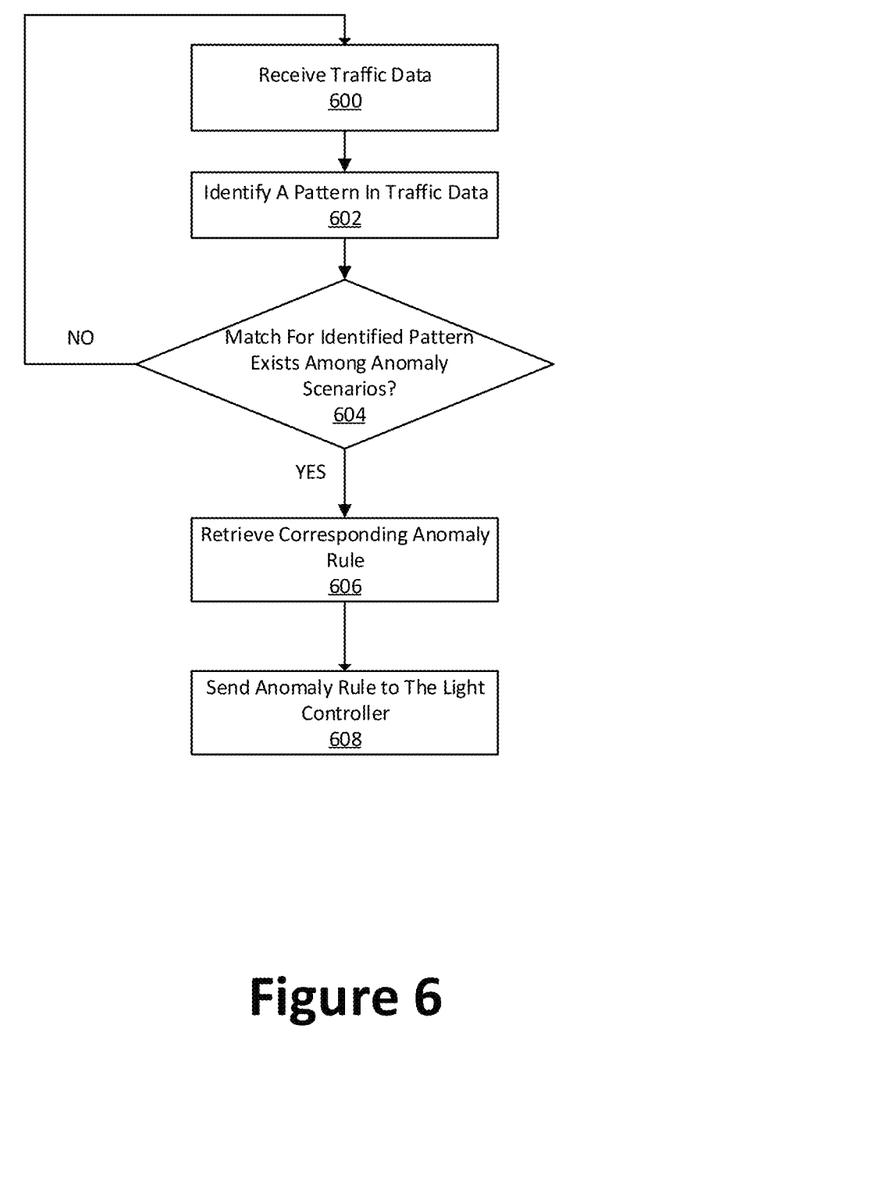
FIG. 6 illustrates a flowchart showing a method executed by the traffic controller of FIG. 1, according to one example embodiment.

With examples having been described for detecting anomalies and recording anomaly scenarios and corresponding rules, the disclosure now turns to FIG. 6 for applying anomaly rules to prevent future anomalies from occurring.

FIG. 6 illustrates a flowchart showing a method executed by the traffic controller of FIG. 1, according to one example embodiment. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 6 will be described from the perspective of the traffic controller 106. However, it will be understood that the functionalities of the traffic controller 106 are implemented by the processor 202 executing computer-readable instructions stored on the memory 206 described with reference to FIG. 2.

At step 600, the traffic controller 106 may receive traffic data in a similar manner as described above with reference to step 400 of FIG. 4.

At step 602, the traffic controller 106 may identify a pattern in the traffic data. In one example, the traffic controller 106 identifies the pattern for the traffic data over a time interval. Duration of the time interval may be the same as the duration of time intervals for which data is stored in table 500 of FIG. 5. In one example, the traffic controller 106 may identify the pattern over at least two or more time intervals. The pattern may include information such as, but not limited to, average traffic flow rate through the intersection 101 over the time interval(s), average traffic flow rate through each zone of the intersection 101, types of vehicles/objects at the intersection 101 or different zones thereof, etc.

In one example, the traffic controller 106 may perform steps 602 by executing the computer-readable instructions corresponding to the anomaly detection module 210.

At step 604, the traffic controller 106 determines if a match for the identified pattern of step 602 exists among the anomaly scenarios stored in the anomaly scenario database 112.

If a match does not exists, the process returns to step 600 and the traffic controller 106 repeats steps 600 to 604. However, if a match is identified at step 606, then at step 606, the traffic controller 106 retrieves a corresponding anomaly rule for the matched anomaly scenario from the anomaly rules database 114. The retrieved rule can include parameters and specifications of control settings (e.g., light phase for each zone and duration thereof) to be applied to the traffic light(s) 117 for managing light phases at different zones of the intersection 101 to prevent future occurrences of the corresponding anomaly.

Thereafter, at step 608, the traffic controller 106 may send the retrieved rule and the corresponding traffic control settings to the light controller 102 to be applied at the intersection 101 to prevent the likely anomaly from occurring.

With examples having been described for detecting anomalies and recording anomaly scenarios and corresponding rules, the disclosure now turns to FIG. 6 for applying anomaly rules to prevent future anomalies from occurring.

Figure 7:
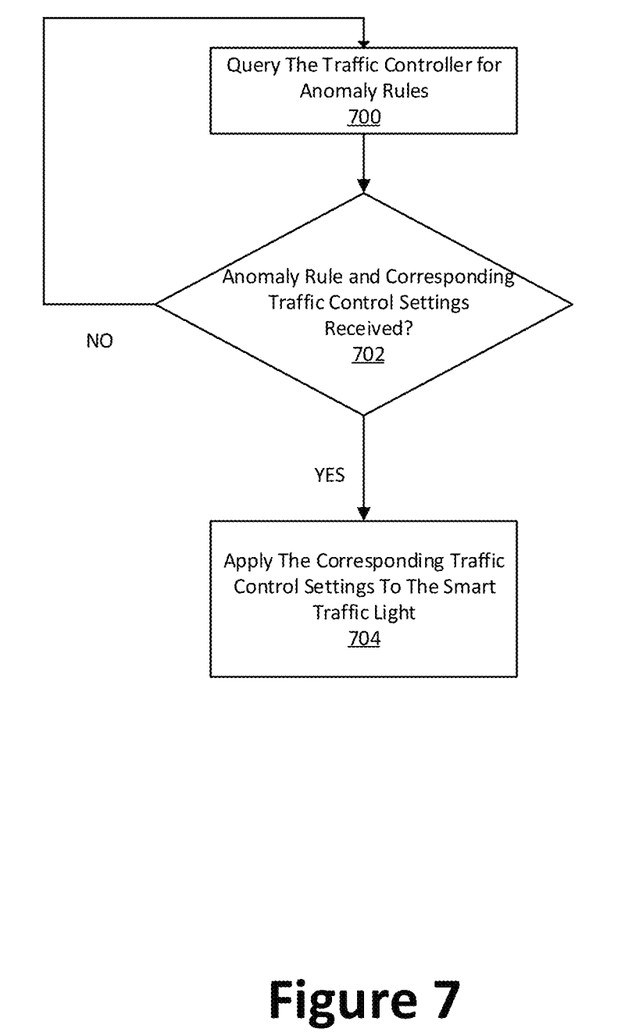
FIG. 7 illustrates a flowchart showing a method executed by the light controller of FIG. 1, according to one example embodiment.

FIG. 7 illustrates a flowchart showing a method executed by the light controller of FIG. 1, according to one example embodiment. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 7 will be described from the perspective of the traffic controller 102. However, it will be understood that the functionalities of the light controller 102 are implemented by the processor 302 executing computer-readable instructions stored on the memory 306 described with reference to FIG. 3.

At step 700, the light controller 102 may query the traffic controller 106 for anomaly rules and corresponding traffic control settings to apply at the intersection 101. The anomaly rules and corresponding traffic control settings may be determined as described above with reference to FIGS. 4-6.

At step 702, the light controller 102 determines if an anomaly rule and corresponding traffic control settings are received. If not, the process reverts back to step 700 and the light controller 102 repeats step 700 ever predetermined period of time (a configurable parameter that may be determined based on experiments and/or empirical studies) until at least one anomaly rule and corresponding traffic control settings are received.

In one example, the light controller 102 may perform steps 700 and/or 702 by executing the computer-readable instructions corresponding to the anomaly control module 310.

Once the light controller determines at step 702 that at least one anomaly rule and corresponding traffic control settings are received, then at step 704, the light controller 102 applies the received traffic control settings to the traffic light 117 for controlling traffic through one or more zones of the intersection 101 in order to prevent a likely similar anomaly from occurring.

In one example, the light controller 102 may perform step 704 by executing the computer-readable instructions corresponding to the anomaly control module 312.

In one example, not only the traffic control settings received by the light controller 102 includes specifications of light phases and durations thereof to be applied to each zone of the intersection 101, it may also include suggestions or directions to be communicated to identified (or approaching) objects at the intersection 101 to further reduce the likelihood of an anomaly from occurring.

For example, if a traffic pattern indicates a likelihood of an anomaly, the corresponding anomaly rule may include instructions to be communicated to objects approaching the intersection 101 informing them of the possible anomaly and/or provide suggestions on how to avoid the anomaly (e.g., by suggestion alternative routes to be taken to bypass traveling through the intersection 101).

Accordingly, at the time of (or instead of) applying the traffic control settings to the traffic light 117 at step 704, the light controller 102 may send signals to vehicles/objects at the intersection 101 and/or those approaching the intersection 101 (e.g., detected within a predetermined distance (e.g., 0.1 mile) of the intersection 101) to notify them of the likely anomaly and/or provide suggestions to avoid traveling through the intersection 101. The notification may be transmitted to radio receivers of the identified vehicles and displayed on a screen thereof or to smart mobile devices of users (pedestrians, drivers, riders) at the intersection 101.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e. g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

We claim:

1. A method of adaptive traffic control, the method comprising:
   receiving traffic data at an intersection;
   determining statistics associated with traffic at the intersection based on the traffic data;
   detecting an anomaly in the traffic based on the statistics;
   responsive to detecting the anomaly, creating a new anomaly rule based on a portion of the statistics associated with the traffic at the intersection over at least one time interval prior to detection of the anomaly; and
   utilizing the new anomaly rule to adaptively control the traffic at the intersection to prevent future occurrences of the anomaly at the intersection.

2. The method of claim 1, wherein determining the statistics comprises:
   recording, for each of a plurality of time intervals, one or more of the statistics associated with the traffic, the one or more statistics including at least one of:
   an average traffic flow rate at the intersection;
   an average traffic flow rate at each identified zone of the intersection;

types of objects at each identified zone of the intersection; or a phase status of a traffic signal at each identified zone of the intersection.

3. The method of claim 2, further comprising:

determining a type of each object detected at the intersection, a type being one of a pedestrian, a car, a truck, a motor cycle or a bicycle.

4. The method of claim 2, wherein the anomaly is detected when the average traffic flow rate at the intersection is equal to or less than a predetermined threshold for at least two of the plurality of time intervals, consecutively.

5. The method of claim 4, wherein the portion of the statistics based on which the new anomaly rule is created corresponds to one or more of the statistics recorded over one or more of the plurality of time intervals preceding a first time interval over which the average traffic flow rate is equal to or less than the threshold.

6. The method of claim 1, wherein the new anomaly rule has one or more traffic control settings to be applied to a traffic light at the intersection to prevent the future occurrences of the anomaly.

7. The method of claim 1, utilizing the new anomaly rule comprises:

subsequent to creating the new anomaly rule, monitoring traffic conditions at the intersection;

determining a traffic pattern at the intersection based on the monitoring;

determining if the traffic pattern matches an anomaly scenario stored in an anomaly scenario database, the anomaly scenario corresponding to the portion of the statistics for which the new anomaly rule is created; and based on the determining, applying the new anomaly rule to a traffic light at the intersection.

8. The method of claim 1, wherein utilizing the new anomaly rule comprises:

receiving a query from a light controller for the new anomaly rule; and sending the new anomaly rule and corresponding traffic control settings to the light controller to be applied to a traffic light for preventing the future occurrences of the anomaly.

9. A traffic controller comprising:

memory having computer-readable instructions stored thereon; and one or more processors configured to execute the computer-readable instructions to:

receive traffic data at an intersection;

determine statistics associated with traffic at the intersection based on the traffic data;

detect an anomaly in the traffic based on the statistics;

responsive to detecting the anomaly, creating a new anomaly rule based on a portion of the statistics associated with the traffic at the intersection over at least one time interval prior to detection of the anomaly; and utilize the new anomaly rule to adaptively control the traffic at the intersection to prevent future occurrences of the anomaly at the intersection.

10. The traffic controller of claim 9, wherein the one or more processors are configured to execute the computer-readable instructions to determine the statistics by:

recording, for each of a plurality of time intervals, one or more of the statistics associated with the traffic, the one or more statistics includes at least one of:

an average traffic flow rate at the intersection;

an average traffic flow rate at each identified zone of the intersection;

types of objects at each identified zone of the intersection; or a phase status of a traffic signal at each identified zone of the intersection.

11. The traffic controller of claim 10, wherein the one or more processors are configured to execute the computer-readable instructions to:

determine a type of each object detected at the intersection, a type being one of a pedestrian, a car, a truck, a motor cycle or a bicycle.

12. The traffic controller of claim 10, wherein the one or more processors are configured to execute the computer-readable instructions to detect the anomaly when the average traffic flow rate at the intersection is equal to or less than a threshold for at least two of the plurality of time intervals, consecutively.

13. The traffic controller of claim 12, wherein the portion of the statistics based on which the new anomaly rule is created corresponds to one or more of the statistics recorded over one or more of the plurality of time intervals preceding a first time interval over which the average traffic flow rate is equal to or less than the threshold.

14. The traffic controller of claim 9, wherein the new anomaly rule has one or more traffic control settings to be applied to a traffic light at the intersection to prevent the future occurrences of the anomaly.

15. The traffic controller of claim 9, wherein the one or more processors are configured to execute the computer-readable instructions to transmit the new anomaly rule to a light controller configured to control traffic light settings at the intersection.

16. The traffic controller of claim 9, wherein the traffic data are captured via one or more sensors and include at least one of audio, video and image data corresponding to the traffic at the intersection.

17. One or more computer-readable medium having computer-readable instructions stored thereon, which when executed by one or more processors, cause the one or more processors to:

receive traffic data at an intersection;

determine, for each of a plurality of time intervals and based on the traffic data, corresponding statistics associated with traffic at the intersection based on the traffic data;

detect an anomaly in the traffic for at least two of the plurality of time intervals, consecutively;

generate an anomaly scenario based on statistics determined for at least one of the time intervals preceding a first one of the at least two of the plurality of time intervals, consecutively;

responsive to detecting the anomaly, create a new anomaly rule for the anomaly scenario; and send the new anomaly rule to a light controller to adaptively control the traffic at the intersection to prevent future occurrences of the anomaly at the intersection.

18. The one or more computer-readable medium of claim 17, wherein the corresponding statistics of each of the plurality of time intervals includes at least one of:

an average traffic flow rate at the intersection;

an average traffic flow rate at each identified zone of the intersection;

types of objects at each identified zone of the intersection; or a phase status of a traffic signal at each identified zone of the intersection.

19. The one or more computer-readable medium of claim 18, wherein the execution of the computer-readable instructions cause the one or more processors to:
   determine a type of each object detected at the intersection, a type being one of a pedestrian, a car, a truck, a motor cycle or a bicycle.

20. The one or more computer-readable medium of claim 17, wherein the execution of the computer-readable instructions cause the one or more processors to detect the anomaly when an average traffic flow rate at the intersection is equal to or less than a threshold for the at least two of the plurality of time intervals, consecutively.

* * * * *